Dec. 17, 1968  K. W. NOLIN, JR  3,416,676
HYDRAULIC POWER MEANS FOR CONVEYORS AND THE LIKE
WITH AUTOMATIC SHUTOFF MEANS
Filed March 3, 1966

INVENTOR.
KARL W. NOLIN JR.
BY
ATTORNEYS 3,416,676
HYDRAULIC POWER MEANS FOR CONVEYORS AND THE LIKE WITH AUTOMATIC SHUTOFF MEANS
Karl W. Nolin, Jr., Lake City, Iowa 51449
Filed Mar. 3, 1966, Ser. No. 531,714
1 Claim. (Cl. 214—17)

ABSTRACT OF THE DISCLOSURE

A hydraulic power means for conveyors and the like having a hydraulic power means operatively connected to a power shaft and in communication with the upper end of a storage compartment, and control means on the hydraulic power means adapted to de-energize the power means when reverse torque of predetermined magnitude is imparted thereto.

---

This invention relates to a hydraulic power means and more particularly to a hydraulic means which may be operatively connected to a conveyor means or to a power shaft and which will automatically shut off when the torque on the conveying means or the power shaft reaches a predetermined level.

Conveyors are commonly driven by pulleys or chains and if the conveyor meets with any resistance, the chains break, the belts slip or the motor "burns out." Conveyors of the screw type are commonly used to fill a granary or storage area. If the storage area becomes full, the conveyor becomes plugged and the motor is usually damaged. Mercury switches and the like have been provided in the storage areas to energize and de-energize the conveyor but have proved unsuccessful due to their failure to operate each and every time. The failure to operate is caused by the switches engaging foreign material within the storage area.

It is also desirable to provide a means for automatically de-energizing a power shaft to prevent damage to the associated machinery should the torque on the power shaft be substantially increased such as would occur if foreign material or the like enters the machine.

Therefore, it is a principal object of this invention to provide a hydraulic power means which will be automatically de-energized when the torque imposed thereon reaches a predetermined level.

A further object of this invention is to provide a hydraulic powered conveyor means which will be shut off when the storage area which the conveyor means is filling becomes full.

A further object of this invention is to provide a hydraulic power means which is economical of manufacture, durable in use and refined in appearance.

These and other objects will be apparent to those skilled in the art.

Figure 1:
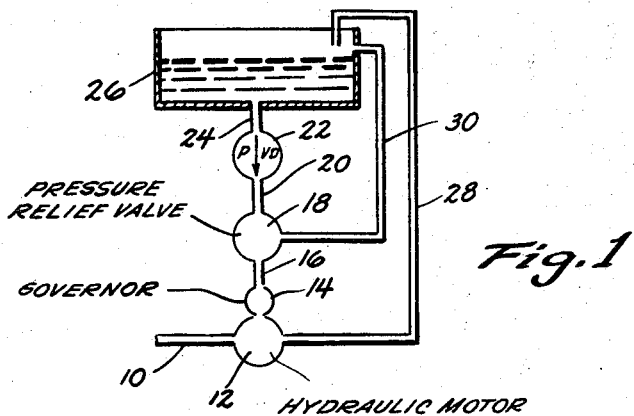
Figure 2:
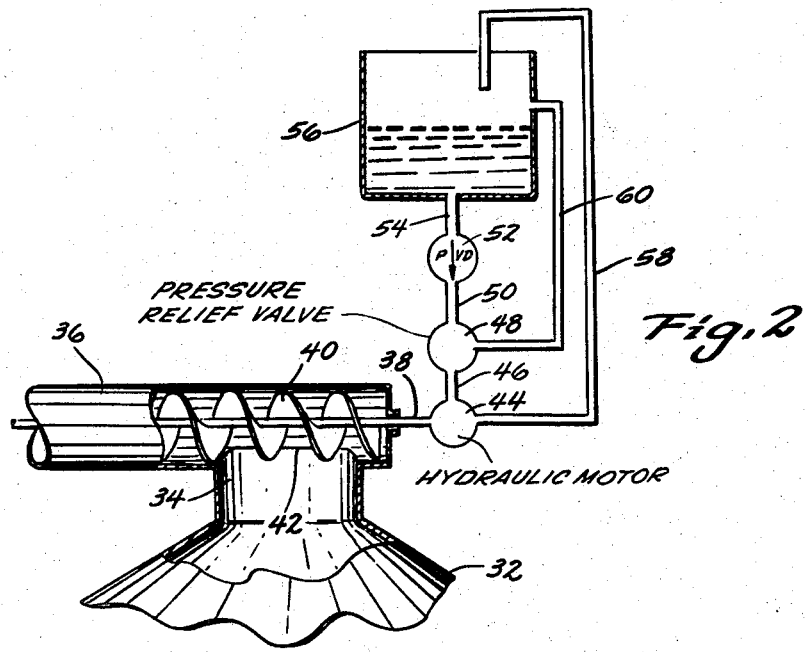

This invention consists in the construction, arrangements, and combination of the various parts of the device, whereby the objects contemplated are attained as hereinafter more fully set forth, specifically pointed out in the claim, and illustrated in the accompanying drawings in which:

FIG. 1 is a schematic view of the hydraulic power means operatively connected to a rotatable power shaft; and FIG. 2 is a fragmentary side view of a storage area and a hydraulically powered conveyor means, the hydraulic power means being illustrated in schematic form.

With respect to FIG. 1, the numeral 10 generally designates a rotatable power or drive shaft which may be connected to any machinery employing the same. A conventional hydraulic motor 12 is operatively connected to power shaft 10 for rotation of the same. A conventional governor means 14 is operatively connected to motor 12 and is designed to regulate the speed of motor 12. Governor 14 is optional and if not used, motor 12 should be of the variable type whereby the r.p.m. therefore may be selectively controlled.

A conduit 16 extends between governor 14 and a pressure relief valve 18 which may or may not be of the variable type. Extending between valve 18 and a variable delivery pump 22 is a conduit 20. A conduit 24 extends between pump 22 and reservoir 26. Pump 22 is powered by any suitable power means such as an electric motor or the like. A return flow conduit 28 extends between motor 12 and reservoir 26. Extending between valve 18 and reservoir 26 is a bypass conduit 30.

With respect to FIG. 2, the numeral 32 generally designates a granary or the like having an access opening 34 at the upper end thereof. The numeral 36 designates a conveyor of the screw type having a rotatable shaft 38 mounted therein with flighting 40 mounted thereon. Conveyor 36 is provided with a discharge opening 42 formed thereon which permits communication between the interiors of conveyor 36 and granary 32. Shaft 38 rotatably extends from one end of conveyor 36 and is operatively connected to a conventional hydraulic motor 44 which imparts rotation to shaft 38 and flighting 40. The other end of conveyor 36 is in communication with a source of material which is to be deposited in ganary 32.

A conduit 46 extends between motor 44 and a pressure relief valve 48 and a conduit 50 extends between valve 48 and a variable delivery pump 52 which is powered by any convenient power means. A conduit 54 extends between pump 52 and reservoir 56. A return flow conduit 58 extends between motor 44 and reservoir 56 and a bypass conduit 60 extends between valve 48 and reservoir 56.

With the respect to the embodiment of FIG. 1, the normal method of operation is as follows. Power shaft 10 would be operatively connected to any machine employing a rotatable power shaft, such as feed grinders, grain dryers, grain elevators, grain cleaners, etc. Power shaft 10 would be caused to rotate by simply energizing pump 22 in conventional fashion. The fluid would pass from reservoir 26 and through conduit 24, pump 22, conduit 20, relief valve 18, conduit 16 and into motor 12 to cause the operation of motor 12 and the rotation of power shaft 10. The fluid would return from motor 12 to reservoir 26 by means of return conduit 24. The speed of motor 12 would depend upon the rate of delivery of pump 22 which may be selectively varied if desired. Governor 14, if utilized, would control the rotation of motor 12 and hence shaft 10.

If the machine to which shaft 10 is connected encounters a substantial resistance due to foreign material or the like being introduced therein, the torque on shaft 10 will be increased which will cause torque to be transferred to motor 12. The torque imposed on motor 12 causes pressure to be built up in conduit 16 and hence in valve 18. When the back pressure imposed on valve 18 reaches a predetermined level, valve 18 will relieve the pressure by diverting the fluid back into reservoir 26 by means of bypass conduit 30 which deenergizes motor 12. When the back pressure on valve 18 drops below the predetermined level, motor 12 will again be energized. Thus it can be seen that the unique hydraulic power means of FIG. 1 prevents damage to the associated machinery by simply automatically de-energizing motor 12 until the resistance to the rotation of shaft 10 is lowered to a predetermined level. The variable delivery pump 22 permits predetermined rates of fluid to be supplied to motor 12 to regulate the speed of rotation of shaft 10. The relief valve 18 permits the hydraulic pump or means to be regulated to permit the de-energization of motor 12 when a predetermined back pressure is encountered. Governor 14, if used, would obviously control the rate of rotation of shaft 10.

The embodiment of FIG 2 functions substantially as the embodiment of FIG. 1. Conveyor 36 would deposit material in granary 32 due to the rotation of shaft 38 by hydraulic motor 44. If the granary becomes full, the discharge material will back up into conveyor 36 and create a resistance to the rotation of shaft 38 and flighting 40. When the resistance to the rotation of shaft 38 reaches a predetermined level, relief valve 48 will de-energize motor 44 as did the relief valve of FIG. 1. As soon as the level of material in granary 32 falls below conveyor 36, such as would be the case when the material is being discharged or removed from granary 36, the motor 44 would again be energized due to the reduction in the resistance to the rotation of shaft 38.

If desired, an alarm system could be incorporated into the embodiments of FIGS. 1 or 2 whereby the attendant would be warned that the machinery had encountered a resistance sufficient to de-energize the hydraulic motor.

Governor 14 can function in any of three ways, namely: (1) by varying the fluid input to motor 12; (2) by regulating variable displacement of motor 12; and (3) by a variable orifice at 14 which would allow varying amounts of fluid to flow to the hydraulic motor 12 and forcing the remainder through pressure relief valve 18.

Thus it can be seen that a unique means has been provided whereby the hydraulic power means will be de-energized to prevent damage to the associated equipment. Thus it can be seen that the device accomplishes at least all of its stated objectives.

Some changes may be made in the construction and arrangement of my hydraulic power means for conveyors and the like with automatic shutoff means without departing from the real spirit and purpose of my invention, and it is my intention to cover by my claim, any modified forms of structure or use of mechanical equivalents which may be reasonably included within their scope.

I claim:
1. In combination,
    a rotatable power shaft,
    a screw conveyor means operatively connected to said power shaft and in operative communication with the upper end of a storage compartment,
    a hydraulic power means operatively connected to said power shaft to cause the rotation thereof,
    said power means being fluidly connected to a source of fluid pressure by a conduit means,
    a control means including a pressure relief valve means in said conduit means,
    said pressure relief valve means adapted to de-energize said hydraulic power means when a reverse torque of predetermined magnitude is imparted to said power shaft when the material being deposited in said storage compartment reaches a sufficient level therein to cause the material to back up into said conveyor means to create a resistance to the rotation of said power shaft.

References Cited
UNITED STATES PATENTS

| | | | |
|---|---|---|---|
| 2,408,284 | 9/1946 | Anthony | 214—82 |
| 3,171,558 | 3/1965 | Sharp | 214—522 |
| 1,828,984 | 10/1931 | Schweickart. | |
| 2,698,964 | 1/1955 | Tornberg | 198—213 XR |
| 3,237,788 | 3/1966 | Weaver et al. | |

ROBERT G. SHERIDAN, *Primary Examiner.*

U.S. Cl. X.R.

198—37, 213; 222—56